Patented Nov. 22, 1938

2,137,393

UNITED STATES PATENT OFFICE 2,137,393

PROCESS OF POLYMERIZING STYRENE

George L. Dorough, Holly Oak, and George D. Graves, Bellefonte, Del., assignors to E. I. du Pont de Nemours & Company, Wilmington, Del., a corporation of Delaware No Drawing. Application July 22, 1937, Serial No. 154,999

8 Claims. (Cl. 260—2)

This invention relates to styrene polymerization products and to a polymerization process and, more particularly, to the polymerization of styrene or mixtures of styrene with certain other polymerizable organic compounds, in the presence of a polymerization catalyst.

Monomeric styrene has heretofore been polymerized in the presence of certain "oxygen-yielding" compounds which have tended to accelerate the rate of polymerization. These compounds are used in catalytic amounts and are generally referred to as "polymerization catalysts." Benzoyl peroxide is probably the most commonly used of these heretofore known catalysts.

An object of the present invention is to provide a simple and economical process of polymerizing styrene. Another object is to provide a process of obtaining a more highly polymerized styrene than heretofore known, i. e., one having a higher viscosity and softening point. A still further object is to provide a practical process of preparing interpolymers of styrene with other polymerizable organic compounds.

The above objects are accomplished according to the present invention by subjecting monomeric styrene, or a mixture of monomeric styrene with an ester of methacrylic acid, to polymerizing conditions in the presence of sulfur dioxide as a catalyst. Preferably, the present invention is carried out by dispersing or dissolving monomeric styrene in a liquid medium in the presence of sulfur dioxide and then subjecting same to polymerizing conditions to thereby obtain a polymerized styrene in granular or pulverulent form.

In a preferred embodiment of the invention, the monomeric styrene is dispersed in water, or a water-alcohol solution, in the presence of sulfur dioxide and then subjected to polymerizing conditions whereby a more highly polymerized polymeric styrene may be obtained.

It has been discovered that sulfur dioxide, which is not an oxygen-yielding catalyst such as the organic peroxides heretofore commonly used, is an effective catalyst for the polymerization of styrene and that, when the polymerization is carried out under certain conditions using sulfur dioxide as a polymerization catalyst, a styrene polymer having radically higher viscosity characteristics and a higher softening point, is obtained.

In order to illustrate the present invention, the following examples, wherein all parts are by weight, are given:

Example I.—A mixture of 25 parts of monomeric styrene, 0.25 part of sulfur dioxide, and 100 parts of water was stirred with heating under a reflux condenser for 24 hours. At the end of this time the styrene had polymerized and largely settled out of the suspension. The polymer was filtered off and washed with alcohol. The viscosity of a 40% solution of the resulting styrene polymer in toluene was approximately 121 poises at 25° C. The softening point of a chip molded from said polymer at a temperature of 125–140° C., measured with the penetrometer, was 105–110° C. A 60% yield of polymer was obtained.

If desired, any styrene polymer remaining in suspension in the reaction mixture may be precipitated by the addition of a little acid.

Example II.—A solution of 25 parts of monomeric styrene in an equal weight of ethyl benzene was placed in a flask equipped with a stirrer and reflux condenser. Sulfur dioxide gas was slowly passed into the mixture which was heated at 110–115° C. for 48 hours. The reaction mixture was poured into alcohol and the polymeric styrene held in solution up to this point, was thereupon precipitated. The precipitated polymer was washed with hot alcohol until substantially odorless and then dried in vacuo. The polymer thus obtained softened at 95–100° C. The viscosity of a 40% solution of the polymer in toluene was 3.1 poises at 25° C. as compared with a viscosity of 121 poises of the solution of the polymeric styrene formed in Example I.

Example III.—A mixture of 25 parts of monomeric styrene, 1 part of sulfur dioxide, and 100 parts of water was heated with stirring at 90–100° C. under a reflux condenser for 24 hours. At the end of that time the polymerized styrene was in the form of a suspension in the reaction mixture. The polymer was allowed to settle out and was washed with alcohol and dried. On testing a chip of the resulting polymer as in Example I its softening point was established at 110° C.

Example IV.—A mixture of 15 parts of monomeric styrene, 85 parts of monomeric methyl methacrylate, 1 part of sulfur dioxide, and 400 parts of water in a flask equipped with a reflux condenser and stirrer, was heated with vigorous stirring under gentle reflux for 9 hours. At the end of that time the product had partially separated in lumps but considerable polymer remained in suspension as a stable emulsion. The polymer in suspension was coagulated by the addition of a small amount of mineral acid. The product, purified as described in the preceding examples, was a granular white solid which softened at 119° C. A 10% solution of the polymer in toluene had a viscosity of 7 poises at 25° C.

The above examples are merely illustrative and it will be understood that, while the invention is primarily intended for the production of polymeric styrene, or interpolymers of styrene and esters of methacrylic acid, in granular or pulverulent form, glass clear, bubble free cast masses of polymeric styrene may be produced by polymerizing monomeric styrene, in the absence of a liquid dispersing or solvent medium, in a mold in the presence of sulfur dioxide.

In the preferred process in which the polymer is obtained in granular or pulverulent form adapted for use as a molding compound, the liquid medium employed may be a non-solvent for both the monomeric and polymeric styrene as, for example, water or water-alcohol mixtures in which the proportion of alcohol is relatively low, or the liquid medium employed may be a solvent for the monomeric styrene but not for the polymer as, for example, aliphatic alcohols including methyl, ethyl, propyl, butyl, and amyl alcohols, and the like, and mixtures of the same with water in which the proportion of alcohol is relatively high. In either case, where the polymer does not completely separate out from the suspension formed, a coagulant such as hydrochloric acid or other mineral acid may be used to facilitate recovery by the polymer.

As shown in Example II, the liquid medium may be a solvent for both monomeric and polymeric styrene as, for example, aromatic hydrocarbons including benzene, ethyl benzene, toluene, xylene, and the like, and cyclic ethers as dioxan. When using this type of medium, recovery of polymer from the solvent is conveniently accomplished by pouring the solution into a non-solvent liquid.

The polymerization may be carried out under any of the conditions well known in the art. Polymerization by exposure to ultraviolet light at room temperature, or elevated temperature, or the use of heat at either atmospheric or superatmospheric pressure may be employed. When a liquid medium is used to obtain a more or less granular product, it is preferred to carry out the polymerization at about the boiling point of the mixture but the use of a lower temperature is not precluded and also the polymerization may be carried out under pressure.

As will be understood by those skilled in the art, modifying agents as plasticizers, fillers, and also dyes and pigments, and like coloring matter, may be added before, during, or after polymerization. The proportion of sulfur dioxide employed may be varied widely. Generally not less than about 0.5% of sulfur dioxide based upon the weight of styrene monomer is used, although even smaller amounts are not precluded. As illustrated in the examples, from 1-4% of sulfur dioxide based upon the weight of styrene gives good results but much larger proportions may be employed. In no case does the sulfur dioxide combine chemically with the styrene so that the products described herein are substantially pure styrene polymer unless modifying agents have been added deliberately.

If desired, the monomeric styrene may be emulsified with the liquid medium such as water with the aid of a suitable emulsifying agent such as dodecyl pyridinium chloride, dodecyl sodium sulfate, or sodium oleate, and the mixture then subjected to polymerizing conditions substantially as described in the examples. The presence of the emulsifying agent minimizes premature precipitation or separation of the polymerized styrene and, under certain conditions, this is desirable.

In Example IV was illustrated the polymerization of a mixture of monomeric styrene and monomeric methyl methacrylate. In like manner, interpolymers of styrene with other esters of methacrylic acid may be obtained. Such other esters include the ethyl, propyl, butyl, amyl, cetyl, cyclohexyl, and bornyl methacrylates and ethylene glycol dimethacrylate, and the like, as well as mixtures thereof.

By carrying out the polymerization of styrene substantially in accordance with Examples I and III, it has been discovered that, unexpectedly, a more highly polymerized styrene polymer is obtained, this being indicated particularly by the radically higher viscosity characteristics of styrene polymers prepared in this way as compared to styrene polymers heretofore known. This is illustrated in the following table, the viscosities being based on 40% solutions of the polymer in toluene:

| Polymer | Solvent or diluent | Catalyst | Polymerization conditions | Toughness | Viscosity (poises) |
|---|---|---|---|---|---|
| Styrene | Toluene | None | 115° C. for 48 hrs | Fair | 27.0 |
| Do | do | Benzoyl peroxide | 100° C. for 24 hrs | Brittle | 4.7 |
| Do | Water | Sulfur dioxide | do | Tough | 121.0 |

The process of the present invention affords a convenient means for preparing polymeric styrene and interpolymers of styrene with esters of methacrylic acid. The process is particularly adapted for preparing such polymers in a form adapted for use as a molding compound. Dispersions of polymeric styrene produced in accordance with the present invention, particularly those which contain an emulsifying agent in addition to the sulfur dioxide, may be used directly in the impregnation of paper, cloth, and other bibulous materials, thus avoiding the necessity of isolating the polymer prior to use.

An advantage of the present invention is that sulfur dioxide is unique in functioning, not only as a polymerization catalyst, but also, in the presence of water, as a dispersing agent. This is illustrated in Examples I and III. This dual property of sulfur dioxide is highly advantageous because it makes possible the preparation of polymer in finely divided form without the necessity of separately emulsifying the monomer and carefully polymerizing it in order to avoid breaking up the emulsion. Polymer obtained according to the procedures of Examples I and III is granular and upon precipitation or separation from the dispersion vehicle is obtained in a readily usable form which requires substantially no subsequent purification.

A further advantage of the present invention is that it allows the production of styrene polymer of high or low viscosity as desired.

As many apparently widely different embodiments of this invention may be made without departing from the spirit and scope thereof, it is to be understood that the invention is not limited to the specific embodiments thereof except as defined in the appended claims.

We claim:

1. Process comprising subjecting monomeric styrene to polymerizing conditions in the presence of sulfur dioxide as a catalyst.

2. Process comprising subjecting monomeric styrene to polymerizing conditions in the presence of 1–4 per cent of sulfur dioxide by weight of the monomeric styrene.

3. Process comprising dispersing monomeric styrene in a liquid vehicle and subjecting said dispersion to polymerizing conditions in the presence of sulfur dioxide as a catalyst.

4. Process comprising dispersing monomeric styrene in an aqueous diluent and subjecting same to polymerizing conditions in the presence of sulfur dioxide as a catalyst.

5. Process comprising dissolving monomeric styrene in a liquid medium and subjecting said solution to polymerizing conditions in the presence of sulfur dioxide as a catalyst.

6. Process comprising heating a mixture of monomeric styrene, water as a liquid diluent therefor, and sulfur dioxide as a polymerization catalyst therefore, at a temperature of substantially 100° C. under a reflux condenser while simultaneously agitating said mixture, until at least the greater part of said monomeric styrene has become polymerized.

7. Process comprising subjecting a mixture of monomeric styrene and a monomeric ester of methacrylic acid to polymerizing conditions in the presence of sulfur dioxide as a catalyst.

8. Process comprising subjecting a mixture of monomeric styrene and monomeric methyl methacrylate to polymerizing conditions in the presence of sulfur dioxide at a catalyst.

GEORGE L. DOROUGH.
GEORGE D. GRAVES.